(12) United States Patent
Kueckendahl

(10) Patent No.: US 11,904,620 B2
(45) Date of Patent: Feb. 20, 2024

(54) LASER MARKING SYSTEM

(71) Applicant: ALLTEC ANGEWANDTE LASERLICHT TECHNOLOGIE GMBH, Selmsdorf (DE)

(72) Inventor: Peter J. Kueckendahl, Bad Oldesloe (DE)

(73) Assignee: ALLTEC ANGEWANDTE LASERLICHT TECHNOLOGIE GMBH, Seimsdorf (DK)

( * ) Notice: Subject to any disclaimer, the term of this patent is extended or adjusted under 35 U.S.C. 154(b) by 584 days.

(21) Appl. No.: 16/766,567

(22) PCT Filed: Nov. 22, 2018

(86) PCT No.: PCT/EP2018/082269
§ 371 (c)(1),
(2) Date: May 22, 2020

(87) PCT Pub. No.: WO2019/101886
PCT Pub. Date: May 31, 2019

(65) Prior Publication Data
US 2021/0291573 A1    Sep. 23, 2021

Related U.S. Application Data

(60) Provisional application No. 62/590,004, filed on Nov. 22, 2017, provisional application No. 62/589,966, filed on Nov. 22, 2017.

(51) Int. Cl.
*G02B 26/10* (2006.01)
*G02B 27/00* (2006.01)
(Continued)

(52) U.S. Cl.
CPC .............. *B41M 5/24* (2013.01); *B08B 5/04* (2013.01); *B08B 15/04* (2013.01); *B23K 26/082* (2015.10);
(Continued)

(58) Field of Classification Search
CPC .............. G02B 26/101; G02B 27/0006; B23K 26/082; B23K 26/142; B23K 26/364;
(Continued)

(56) References Cited

U.S. PATENT DOCUMENTS 4,368,080 A    1/1983 Langen
6,288,362 B1   9/2001 Thomas et al.
(Continued)

FOREIGN PATENT DOCUMENTS

CA    2898903 A1    2/2016
CN    102360079 A   2/2012
(Continued)

OTHER PUBLICATIONS

Search Report for CN Application No. 201880087473.6, dated Jan. 5, 2022, 6 pages.
(Continued)

*Primary Examiner* — Justin Seo
*Assistant Examiner* — Kendrick X Liu
(74) *Attorney, Agent, or Firm* — DeLizio, Peacock, Lewin & Guerra, LLP; Gregg Peacock

(57) ABSTRACT

A laser marking system for marking a product comprising a laser source for providing a laser beam, a marking head for projecting the laser beam on to the product, a housing comprising an extraction device configured to generate a flow of extraction fluid for extracting matter generated by an interaction between the laser beam and the product, and a controller for controlling the laser source and the marking
(Continued)

head. The laser marking system further comprises an umbilical assembly connecting the housing to the marking head.

22 Claims, 3 Drawing Sheets

(51) Int. Cl.
| | |
|---|---|
| B23K 26/082 | (2014.01) |
| B23K 26/142 | (2014.01) |
| B23K 26/364 | (2014.01) |
| B23K 26/70 | (2014.01) |
| B23K 26/12 | (2014.01) |
| B08B 5/04 | (2006.01) |
| B08B 15/04 | (2006.01) |
| B41J 3/407 | (2006.01) |
| B41J 2/44 | (2006.01) |
| B41J 2/47 | (2006.01) |
| B41J 2/475 | (2006.01) |
| B41M 5/24 | (2006.01) |
| G02B 26/08 | (2006.01) |
| H01S 3/00 | (2006.01) |
| H01S 3/04 | (2006.01) |
| H01S 3/041 | (2006.01) |
| H01S 3/223 | (2006.01) |

(52) U.S. Cl.
CPC .......... *B23K 26/128* (2013.01); *B23K 26/142* (2015.10); *B23K 26/364* (2015.10); *B23K 26/703* (2015.10); *B41J 2/442* (2013.01); *B41J 2/47* (2013.01); *B41J 2/475* (2013.01); *B41J 3/4073* (2013.01); *G02B 26/0875* (2013.01); *G02B 26/101* (2013.01); *G02B 26/106* (2013.01); *G02B 27/0006* (2013.01); *H01S 3/0071* (2013.01); *H01S 3/041* (2013.01); *H01S 3/0404* (2013.01); *H01S 3/2232* (2013.01)

(58) Field of Classification Search
CPC ...... B23K 26/703; B23K 26/128; B08B 5/04; B08B 15/04; B41J 3/4073; B41J 2/442; B41J 2/47; B41J 2/475; B41M 5/24
See application file for complete search history.

(56) References Cited

U.S. PATENT DOCUMENTS

| | | | |
|---|---|---|---|
| 7,009,141 B1 * | 3/2006 | Wool | B23K 26/0096 |
| | | | 219/121.73 |
| 2006/0151449 A1 | 7/2006 | Warner et al. | |
| 2007/0199930 A1 | 8/2007 | McElroy et al. | |
| 2015/0168713 A1 | 6/2015 | Nowatzyk | |

FOREIGN PATENT DOCUMENTS

| | | | | |
|---|---|---|---|---|
| CN | 103753026 A | | 4/2014 | |
| DE | 3906336 A1 | | 8/1990 | |
| DE | 19817629 A1 | | 10/1999 | |
| DE | 10059246 A1 | | 6/2002 | |
| DE | 19839482 C2 | | 9/2002 | |
| DE | 10255747 A1 | | 6/2004 | |
| DE | 10255747 A1 * | | 6/2004 | ............. B23K 26/12 |
| DE | 102010040521 B3 * | | 1/2012 | ............. G01J 3/443 |
| DE | 102015208560 A1 * | | 11/2016 | |
| DE | 102015208560 A1 | | 11/2016 | |
| EP | 2564977 A2 | | 3/2013 | |
| JP | 2016034654 A | | 3/2016 | |
| JP | 2016175124 A | | 10/2016 | |
| WO | 2010105609 A2 | | 9/2010 | |
| WO | 2012036664 A1 | | 3/2012 | |
| WO | 2016147632 A1 | | 9/2016 | |

OTHER PUBLICATIONS

PCT/EP2018/082269 International Search Report and Written Opinion, dated Jun. 25, 2019, 19 pages.
Office Action in Japanese Patent Application No. 2020-545873, dated Jan. 27, 2023.
Japanese Patent Office Action for JP App. No. 2020-545873 dated Oct. 12, 2023; pp. 1-3.
EPO Patent Office Action for EP App. No. 187807966.9 dated Sep. 28, 2023; pp. 1-5.

* cited by examiner

LASER MARKING SYSTEM

TECHNICAL FIELD

The present invention relates to a laser marking system. Aspects and implementations of the present disclosure are directed generally to laser scanning and laser marking equipment.

BACKGROUND

Current laser markers and scanners are limited during automated production operations in packaging as well as in parts marking production lines. Current laser markers and scanners are typically fixed into production systems relative to articles being marked.

Known laser marking systems often comprise multiple bulky housings for different components of the laser marking system. For example, known laser marking systems often comprise a housing for a laser source, a housing for an extraction device, a housing for a cooling system, a large radiation shielding unit to envelope a part of a production line, and a plurality of inflexible cables and/or conduits connecting different components of the laser marking system together. This tends to make known laser marking systems large, heavy, cumbersome systems that are inflexible in use, difficult to install on a production line and difficult to manoeuvre about the production line. Safety requirements associated with known laser marking systems (e.g. radiation safety requirements and/or fume extraction requirements) also add to the difficulty in installing and safely using known laser marking systems. In order to install and use known laser marking systems, a production line owner typically must first organise an assessment of their production line with safety officers such that customised laser marking system components (e.g. the radiation shieling unit) can be designed and built for their unique production line, resulting in an expensive and time consuming process. The difficulty associated with known laser marking systems is such that there is reluctance amongst production line owners to replace different marking systems (e.g. continuous inkjet marking systems) with the known laser marking systems.

It is in object of the present invention to provide a laser marking system that obviates or mitigates one or more problems of the prior art whether identified herein or elsewhere.

SUMMARY

Aspects and embodiments disclosed herein provide for the easy integration and operation of optical scanning or marking systems, for example, laser scanning or marking systems, into production systems.

According to a first aspect of the invention, there is provided a laser marking system for marking a product. The laser marking system comprises a laser source for providing a laser beam, a marking head for projecting the laser beam on to the product, and a housing. The housing comprises an extraction device configured to generate a flow of extraction fluid for extracting matter generated by an interaction between the laser beam and the product; and a controller for controlling the laser source and the marking head. The laser marking system further comprises an umbilical assembly connecting the housing to the marking head.

The matter to be extracted may, for example, comprise particulate matter and/or gaseous matter.

Known laser marking systems often comprise multiple bulky housings for different components, making the known laser marking systems cumbersome and difficult to install on a production line. The laser marking system advantageously provides a fully integrated solution that is easier to install and use on a production line and offers a less complicated system for end users.

The housing may comprise the laser source. The laser source may, for example, be a $CO_2$ laser.

The marking head may comprise the laser source. The laser source may, for example, be a diode laser that is capable of fitting within the marking head.

The marking head may comprise a radiation shield for protecting a user of the laser marking system from stray radiation.

The radiation shield may act to absorb, redirect, or otherwise block laser radiation from reaching a user of the laser marking system, thereby advantageously providing robust protection for users of the laser marking system. Known radiation shield often take the form of a large box that contains the marking head as well as the laser source and/or at least a portion of the production line in which the laser marking system is used. The compact integrated radiation shield disclosed herein advantageously offers greater flexibility in positioning the marking head on a production line whilst avoiding the bulky radiation shield units typically used in production lines.

The radiation shield may comprise a sensor configured to detect radiation emanating from a gap between a portion of the shield and the product.

The sensor may be for detecting escaping radiation to determine whether or not the radiation shield is blocking an adequate amount of stray light to satisfy laser safety requirements.

The sensor may be configured to detect radiation emanating from the product. For example, the sensor may be configured to detect radiation which has scattered from the product.

The radiation shield may comprise an integrated extraction inlet that is fluidly coupled to the extraction device.

The integrated extraction inlet advantageously provides a compact way of removing unwanted matter (e.g. debris, particulates, gases, etc.) that is generated when the laser beam is incident upon the product to be marked.

The integrated extraction inlet may be configurable to be located substantially adjacent to the product. The integrated extraction inlet being configurable to be located substantially adjacent to the product advantageously provides improved removal of matter.

The radiation shield may comprise a conduit configured to provide a flow of suppression fluid to reduce an amount of debris that is incident upon an optical element of the marking.

The conduit providing suppression fluid advantageously provides a compact way of keeping optics of marking head clean and reducing the risk of damage to the marking head caused by unwanted matter. Integrating the conduit into the radiation shield advantageously reduces the size of the laser marking system relative to known marking systems.

The radiation shield may comprise a flange for providing further protection to a user of the laser marking system from stray radiation.

The flange advantageously provides further protection from stay radiation emanating from the product and/or between the marking head and the product. The flange may take any desired form such as, for example, a labyrinthine projection from an end portion of the radiation shield.

The radiation shield may comprise a flexible member arranged to reduce a gap between the radiation shield and the product for providing further protection to a user of the laser marking system from stray radiation.

The flexible member advantageously provides protection from stay radiation emanating from the product and/or between the marking head and the product. The flexible member may completely close the gap between the marking head and the product, thereby blocking substantially all radiation from reaching a user of the laser marking system. The flexibility of the flexible member may advantageously accommodate deviations of a topography or height of the product to be marked without damaging the marking head and/or the product.

The extraction device may be configured to provide cooling to the laser source. Known laser marking systems often comprise a separate cooling system. This advantageously utilizes a feature of the extraction device to cool the laser source, thereby removing the need for a separate cooling system. This in turn reduces the size and complexity of the laser marking system.

The extraction device may be configured to provide cooling to the power supply. The extraction device may be configured to provide cooling to the controller.

The extraction device may be configured to direct the flow of extraction fluid to the laser source and thereby provide cooling to the laser source.

The extraction fluid may be air.

The extraction fluid may be provided to the laser source after filtration of the extraction fluid. The extraction fluid may be provided to the laser source before the extraction fluid is used to extract matter generated between interaction of radiation and product.

The housing may comprise a cooling device configured to cool the extraction fluid before the extraction fluid is directed to the laser source. The cooling device may be a compressor.

The extraction device may comprise a heat exchanger configured to cool the laser source. The extraction device may comprise a fan configured to generate the flow of extraction fluid. The extraction device may comprise a filter configured to capture at least some of the matter.

The marking head may comprise an electromagnetic radiation steering mechanism configured to steer electromagnetic radiation to address a specific location within a two-dimensional field of view.

The marking head may comprise a variable optical path length assembly configured to define an optical path from an input to an output of the variable optical path length assembly.

The marking head may comprise focusing optics.

The marking head may comprise a collimator.

The marking head may be substantially cylindrical.

The marking head may have a first dimension in a first direction of less than around 400 mm and a second dimension in a second direction perpendicular to the first direction of less than around 60 mm. The marking head may have a third dimension in a third direction perpendicular to the first direction and the second direction of less than around 60 mm.

The marking head may comprise a cooling system for providing cooling to a component of the marking head. The cooling system may, for example, provide cooling to motors or actuators (e.g. galvanometers) of components of the marking head (e.g. the electromagnetic radiation steering mechanism). The cooling system may be configured to use the suppression fluid of the radiation shield to cool the component of the marking head. This advantageously enables a dual function of the suppression fluid, thereby removing the need for a separate cooling system.

The umbilical assembly may comprise an electrically conductive cable and ducting for transmitting a fluid. When the housing comprises the laser source, the umbilical assembly may further comprise an optical fibre for transmitting the laser beam.

The electrically conductive cable may be configured to transmit a control signal. The control signal may, for example, comprise a signal for controlling a safety indicator light and/or the laser source.

The electrically conductive cable may be configured to transmit a sensor signal. The sensor signal may, for example, comprise a signal from the sensor of the radiation shield that indicates that an adequate amount of radiation is being blocked by the radiation shield.

The electrically conductive cable may be configured to transmit power. The power may, for example, be transmitted from the power source to components of the marking head such as, for example, a variable optical path assembly.

The ducting may be configured to transmit the suppression fluid to the radiation shield. The ducting may be configured to transmit the extraction fluid from the radiation shield.

The laser marking system may further comprise a detector configured to detect a presence of the product.

The laser marking system may further comprise an encoder.

The laser marking system may further comprise a user interface.

The laser marking system may further comprise a power supply for powering the laser source. The power supply may be located within the housing.

According to a second aspect of the invention there is provided an umbilical assembly for a laser marking system comprising an inner umbilical. The inner umbilical comprises an optical fibre for transmitting a laser beam, and an electrically conductive cable. The umbilical assembly further comprises an outer conduit for transmitting a fluid. The outer conduit is configured to receive the inner umbilical.

The umbilical assembly advantageously provides an integrated solution for transmitting radiation to, and powering, the marking head of a laser marking system whilst also acting as a fume/debris extractor. The umbilical significantly reduces the complexity of the laser marking system compared to known laser marking systems, and increases the ease with which the laser marking system may be installed and used on a production line.

An internal volume of the outer conduit may be large enough to accommodate a marking head of a laser marking system. Having the internal volume of the outer conduit large enough to accommodate a marking head of a laser marking system advantageously enables removal of the outer umbilical assembly without disconnecting the inner umbilical from either housing or marking head.

The outer conduit may be reversibly connectable to a marking head of a laser marking system. The outer conduit may be reversibly connectable to a housing of a laser marking system.

The inner umbilical may be reversibly connectable to a marking head of a laser marking system. The inner umbilical may be reversibly connectable to a housing of a laser marking system.

The outer conduit may be reversibly removable from the inner umbilical.

This advantageously allows access to the inner umbilical without having to disconnect the umbilical assembly. For example, during use, the outer surface of the inner umbilical may become contaminated with matter extracted by the extraction device. By allowing the outer conduit to be removed from the inner umbilical, the outer conduit can be cleaned or replaced. The inner umbilical can also be cleaned while the outer umbilical is removed. Such a cleaning process may be repeated periodically (e.g. every 6 months).

The outer conduit may be separable. The outer conduit may, for example, be split or otherwise parted, advantageously allowing the outer conduit to be removed and/or replaced without having to disconnect the inner umbilical from the housing or the marking head.

The umbilical assembly may further comprise a scrubber configured to clean the inner umbilical. The scrubber advantageously provides an integrated cleaning solution improving an ease with which a user may clean the inner umbilical.

The umbilical assembly may be reversibly sealable to a marking head and a housing of a laser marking system to prevent ingress of fluid and/or debris.

An outer surface of the inner umbilical and/or an inner surface of the outer conduit may comprise a chemically resistant material. An outer surface of the inner umbilical and/or an inner surface of the outer conduit may comprise a heat resistant material. An outer surface of the inner umbilical and/or an inner surface of the outer conduit may comprise a material that is impervious to water. An outer surface of the inner umbilical and/or an inner surface of the outer conduit may be smooth.

The inner umbilical and/or the outer conduit may be formed from a hygienic material. The hygienic material may, for example be approved for use in the food industry.

The electrically conductive cable may be configured to transmit a control signal. The electrically conductive cable may be configured to transmit a plurality of control signals. The electrically conductive cable may be configured to transmit a sensor signal. The electrically conductive cable may be configured to transmit a plurality of sensor signals.

The electrically conductive cable may be configured to transmit power.

The inner umbilical may further comprises ducting for transmitting a fluid. The ducting may be configured to transmit a suppression fluid to a marking head of a laser marking system. The ducting may be configured to transmit a suppression fluid to a radiation shield. The ducting may be configured to transmit an extraction fluid from a marking head of a laser marking system. The ducting may be configured to transmit an extraction fluid from the radiation shield.

The umbilical assembly may comprise a port for connecting the umbilical assembly to an exhaust system. The outer conduit may be configured to transmit an extraction fluid from a marking head of a laser marking system. The outer conduit may be connectable to the exhaust system.

There is also provided a laser marking system for marking a product. The laser marking system comprises a laser source for providing a laser beam; a marking head for projecting the laser beam on to the product; a housing comprising an extraction device configured to generate a flow of extraction fluid for extracting matter generated by an interaction between the laser beam and the product, and a controller for controlling the laser source and the marking head. The laser marking system further comprises an umbilical assembly according to the second aspect of the invention, the umbilical assembly being configured to connect the housing to the marking head.

According to a third aspect of the invention, there is provided a marking head for a laser marking system comprising a radiation shield, the radiation shield being configured to protect a user of the laser marking system from stray radiation, the radiation shield comprising a sensor configured to detect radiation emanating from a gap between a portion of the shield and a product that is to be marked.

Alternatively or additionally, the sensor may be configured to detect radiation emanating from a product that is to be marked. For example, the sensor may be configured to detect radiation which has scattered from the product.

The sensor may be for detecting escaping radiation to determine whether or not the radiation shield is blocking an adequate amount of stray light to satisfy laser safety requirements.

The radiation shield may comprise an integrated extraction inlet that is fluidly coupled to the extraction device. The integrated extraction inlet may comprise a double walled structure, e.g. concentric circles. The integrated extraction inlet may be configurable to be located substantially adjacent to the product.

The radiation shield may comprise a conduit configured to provide a flow of suppression fluid to reduce an amount of debris that is incident upon an optical element of the marking head. The flow of suppression fluid may be configured to push debris away from the marking head.

The radiation shield may comprise a flange for providing further protection to a user of the laser marking system from stray radiation. The flange may comprise a labyrinthine or cone-like projection from the shield configured to further block stray light.

The radiation shield may comprise a flexible member arranged to reduce a gap between the radiation shield and the product for providing further protection to a user of the laser marking system from stray radiation. The radiation shield may comprise a portion formed from a flexible material. The radiation shield may be formed from a flexible material.

The radiation shield may be expandable or contractible, for example, by adding or removing air or another fluid to an internal volume of the radiation shield.

The marking head may further comprise a filter for capturing debris.

The marking head may further comprise a safety device configured to disable a provision of radiation if the radiation shield is not connected to the marking head. The safety device could be an RFID or an interlock.

According to a fourth aspect of the invention there is provided a marking head for a laser marking system, the marking head being configured to project a laser beam on to a product. The marking head comprises a radiation shield configured to protect a user of the laser marking system from stray radiation, the radiation shield comprising: an inner wall defining a radiation path, an outer wall arranged with respect to the inner wall such that a fluid flow path is defined between the inner wall and the outer wall, wherein the fluid flow path is attachable to an extraction device for extracting matter generated by an interaction between a radiation beam and a product to be marked.

By providing an a fluid flow path for extraction of matter (e.g. debris, fumes) integrally with the radiation shield, it is possible to provide a simplified laser marking head, thereby reducing the complexity of installation. That is, rather than a user having to install a laser marking head, and separately having to provide a radiation shield, and further having the provide extraction, the marking head can simply be positioned adjacent to a production line, and operated.

The radiation path may be defined by the inner wall from a laser source towards a product to be marked. The inner wall may define a radiation exit aperture, configured to permit radiation to exit towards the product to be marked.

The marking head may further comprise an extraction fluid inlet for extracting matter generated by an interaction between the radiation beam and the product. The extraction fluid inlet may be provided adjacent to the radiation exit aperture. The extraction fluid inlet may be provided around the radiation exit aperture. For example, the extraction fluid inlet may be disposed around a perimeter of the radiation exit aperture.

The marking head may be configured to be coupled to an umbilical assembly, wherein said umbilical assembly defines a fluid flow path between said radiation shield and an extraction device. The marking head may be configured to receive control signals provided by a control carrier provided within said umbilical assembly. The marking head may be configured to receive radiation from a radiation guide provided within said umbilical assembly.

The marking head may comprise a radiation steering mechanism configured to steer electromagnetic radiation to address a specific location within a two-dimensional field of view.

The marking head may comprise a variable optical path length assembly configured to define an optical path from an input to an output of the variable optical path length assembly.

The laser marking system of the first aspect of the invention may comprise a marking head according to the third or fourth aspect of the invention.

It will be understood that the marking heads of the third and fourth aspects of the invention may be combined with features described in the context of the laser marking system of the first aspect of the invention and/or the umbilical of the second aspect of the invention.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labelled in every drawing. Embodiments of the invention will now be described, by way of example only, with reference to the accompanying schematic drawings, in which.

DETAILED DESCRIPTION

Figure 1:
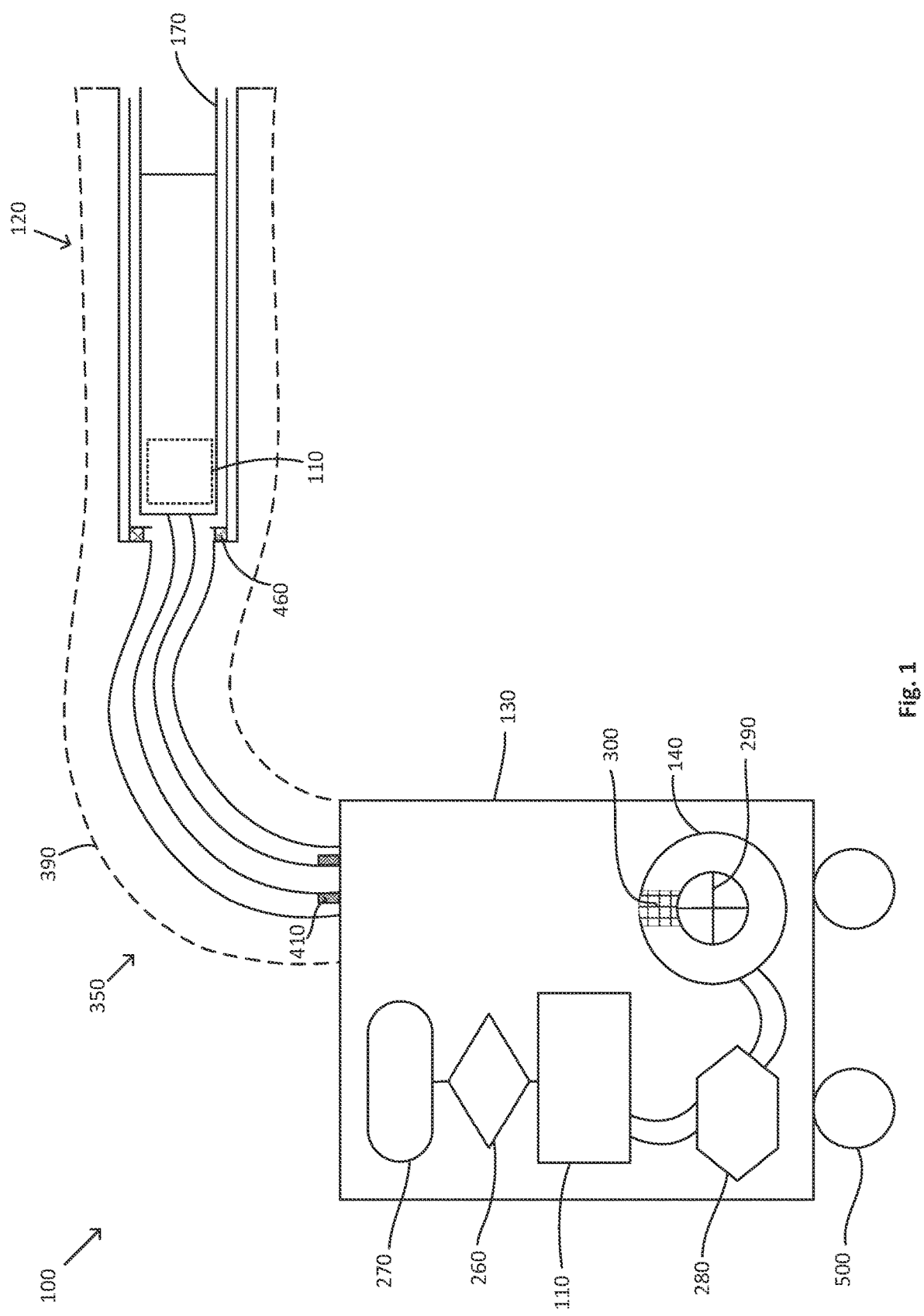
FIG. 1 schematically depicts a cross-sectional view of a laser marking system according to an embodiment of the invention.

Aspects and embodiments disclosed herein are not limited to the details of construction and the arrangement of components set forth in the following description or illustrated in the drawings. Aspects and embodiments disclosed herein are capable of being practiced or of being carried out in various ways.

Aspects and embodiments disclosed herein include a laser scanning or marking system. Laser marking systems may be utilized in production lines for various types of articles or products. Laser marking systems may be utilized to imprint bar codes, unique identifying marks, expiration dates, or other information on items passing through a production line. In some implementations, carbon dioxide (CO2) gas lasers may be used in laser marking systems. Carbon dioxide lasers produce beams of infrared light in four principal wavelength bands centering on 9.3, 9.6, 10.2, and 10.6 micrometers (μm). Lasers utilized in laser marking systems are typically operated at laser power levels in the tens of watts.

Laser scanning or marking systems are not, however limited to using CO2 lasers. In some aspects and embodiments, optical scanners or markers may utilize lasers that operate in the ultraviolet, visible light, or near infrared wavelengths or any other type of laser or optical illumination source. The use of visible light laser beams in laser scanner systems may be advantageous in that a user can see the laser beam where it illuminates an object being scanned so the user can adjust the position of the laser scanner or object being scanned so that the laser illuminates a desired portion of the object.

FIG. 1 schematically depicts a cross-sectional view of a laser marking system 100 according to an embodiment of the invention. The laser marking system 100 comprises a laser source 110 for providing a laser beam (not shown) and a marking head 120 for projecting the laser beam on to a product (not shown). The laser marking system 100 further comprises a housing 130 comprising an extraction device 140 configured to generate a flow of extraction fluid for extracting matter generated by an interaction between the laser beam and the product. In the example of FIG. 1, the housing 130 houses the laser source 110 (e.g. a $CO_2$ laser). In alternative embodiments, the laser source 110 (e.g. a diode laser) may be housed within the marking head 120. The laser marking system 100 further comprises a controller 150 for controlling the laser source 110 and the marking head 120. The laser marking system 100 further comprises an umbilical assembly 350 connecting the housing 130 to the marking head 120. The housing 130 may comprise wheels 500 to allow easy movement of the housing 130 about an installation environment (e.g. a production line).

The marking head comprises a radiation shield 170 for protecting a user of the laser marking system 100 from stray radiation. The radiation shield 170 is shown and discussed in greater detail with reference to FIG. 2.

The laser marking system 100 may further comprise an encoder for converting marking instructions to control signals for the marking head 120. The laser marking system 100 may further comprise a user interface, e.g. a graphical user interface. The user interface may form part of the controller 150. The user interface may, for example, comprise a screen for providing visual signals to a user and/or a speaker for providing audio signals to a user. The laser marking system 100 may comprise a transceiver for remote control of the laser marking system 100. The laser marking system 100 may comprise a connection (e.g. an Internet connection of an Ethernet connection) for integration with other devices (e.g. on a production line of which the laser marking system forms a part) via the Internet of Things.

Figure 2:
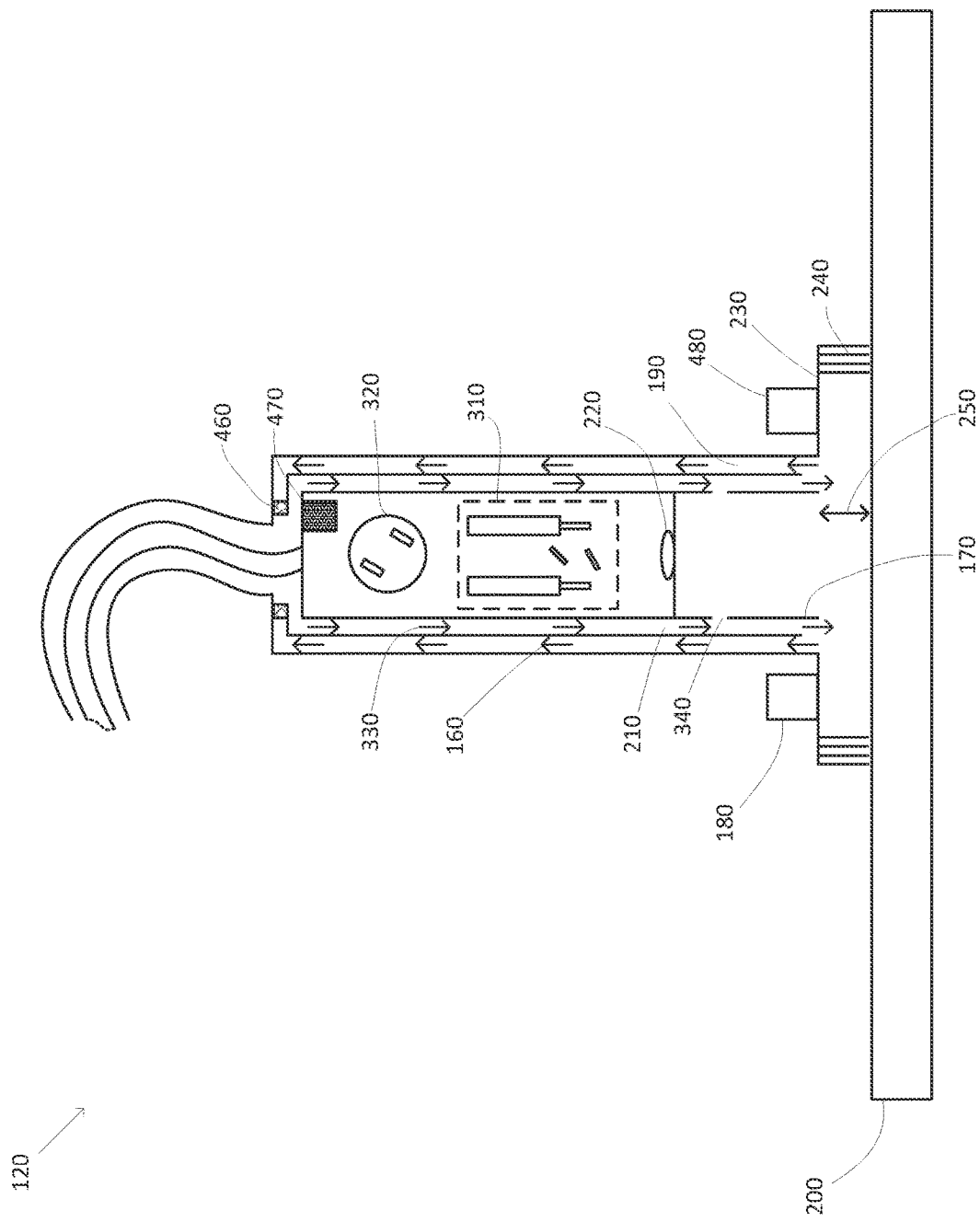
FIG. 2 schematically depicts a magnified cross-sectional view of a marking head according to an embodiment of the invention; and, FIG. 3 schematically depicts a cross-sectional view of the umbilical assembly according to an embodiment of the invention.

FIG. 2 schematically depicts a magnified cross-sectional view of the marking head 120 of FIG. 1. The radiation shield 170 comprises a sensor 180 configured to detect radiation emanating from a product 200 that is to be marked. The sensor 180 may, for example, comprise a photodiode or a camera. The sensor 180 may be configured to detect escaping radiation to determine whether or not the radiation shield 170 is blocking an adequate amount of stray radiation to satisfy laser safety requirements. Different safety requirements may be applicable depending on, for example, a type of the laser being used (e.g. the wavelength and/or power of radiation being produced by the laser). The safety requirements may require a dose of the radiation to not exceed a certain amount if collected (and focused) by a human eye (e.g. a user of the laser marking system). The sensor 180 may be configured to sense radiation across a full circumference of the radiation shield. The sensor 180 may be configured to detect radiation emanating from a gap between the radiation shield 170 and the product 200.

The radiation shield 170 further comprises an integrated extraction inlet 190 that is fluidly coupled to the extraction device of FIG. 1 (not shown in FIG. 2). The integrated extraction inlet 190 is configurable to be located substantially adjacent to the product 200 that is to be marked using the marking head 120. The integrated extraction inlet 190 may, for example, be configurable to be located at a distance that is about two times the gap 250 between the radiation shield 170 and the product 200 or less.

The radiation shield 170 further comprises a conduit 210 configured to provide a flow of suppression fluid 330 to reduce an amount of debris that is incident upon an optical element 220 of the marking head 120. The radiation shield 170 may, for example, comprise apertures 340 that allow some suppression fluid 330 to exit the conduit 210 proximate optics of the marking head 220 and travel towards the product 200 and thereby suppress and/or block debris generated proximate the product 200 from reaching the optics 220 of the marking head 500.

The radiation shield 170 further comprises a flange 230 for providing further protection to a user of the laser marking system from stray radiation. The radiation shield 170 comprises a flexible member 240 arranged to reduce a gap 250 between the radiation shield 170 and the product 200 for providing further protection to a user of the laser marking system from stray radiation.

The radiation shield 170 may be formed from a flexible material. The radiation shield 170 may be expandable or contractible. For example, by adding or removing air or another fluid to an internal volume of the radiation shield 170, the radiation shield 170 may expand. The radiation shield 170 may further comprise a filter 460 for capturing matter produced via an interaction between radiation and a product to be marked by the laser marking system 100. The laser marking system 100 may further comprise a safety device 470 configured to disable a provision of radiation if the radiation shield 170 is not connected to the marking head 120. The safety device 470 may, for example, comprise a radio frequency identifier (i.e. an RFID) and/or an interlock.

Referring again to FIG. 1, the extraction device 140 is configured to provide cooling to the laser source 110. For example, the extraction device 140 may be configured to direct the flow of extraction fluid to the laser source 110 and thereby provide cooling to the laser source 110. The extraction fluid may, for example, comprise air. The extraction fluid may be provided to the laser source 110 after filtration. The extraction fluid may be provided to the laser source 110 before the fluid is used to extract matter generated the marking head 120 and the product (not shown in FIG. 1). For example, the extraction fluid may be provided at a flow rate of about 20 liters per minute. The flow rate required to cool the laser source 110 may at least partially depend upon a distribution of heat load on the laser source 110, a duty cycle of the laser source 110, etc.

The housing 130 may further comprise a power supply 260 configured to provide power to the laser source 110. The extraction device 140 may be configured to provide cooling to the power supply 260. The housing 130 may further comprise a controller 270 for controlling the laser source 110, the extraction device 140 and/or marking head 120. The extraction device 140 may be configured to provide cooling to the controller 270.

The housing 130 may comprise a cooling device 280 configured to cool the extraction fluid before the extraction fluid is directed to the laser source. The cooling device 280 may, for example, comprise a compressor or a heat exchanger. The extraction device 140 comprises a fan 290 configured to generate the flow of extraction fluid. The extraction device 140 may comprise a filter 300 configured to capture at least some of the matter extracted from between the marking head 120 and the product to be marked. The filter 300 may be replaceable after having collected a given amount of matter.

Referring again to FIG. 2, the marking head 120 comprises an electromagnetic radiation steering mechanism 310 configured to steer electromagnetic radiation exiting the marking head 120 of the laser marking system. The marking head 120 further comprises a variable optical path length assembly 320 configured to adjust a focal plane of the laser marking system 100.

The marking head 120 may further comprise focusing optics (not shown) and/or a collimator (not shown). The marking head 120 is substantially cylindrical. The marking head 120 may have a first dimension in a first direction of less than around 400 mm and a second dimension in a second direction perpendicular to the first direction of less than around 60 mm. The marking head 120 may have a third dimension in a third direction perpendicular to the first direction and the second direction of less than around 60 mm.

The marking head 120 may comprise a cooling system for providing cooling to a component (e.g. actuators of the electromagnetic radiation steering mechanism 310 and/or the variable optical path length assembly 320). The cooling system may be configured to use suppression fluid of the radiation shield 170 to cool a component of the marking head 120. The laser marking system may further comprise a detector 480 configured to detect a presence of the product 200. The detector 480 may, for example, comprise a camera.

Figure 3:
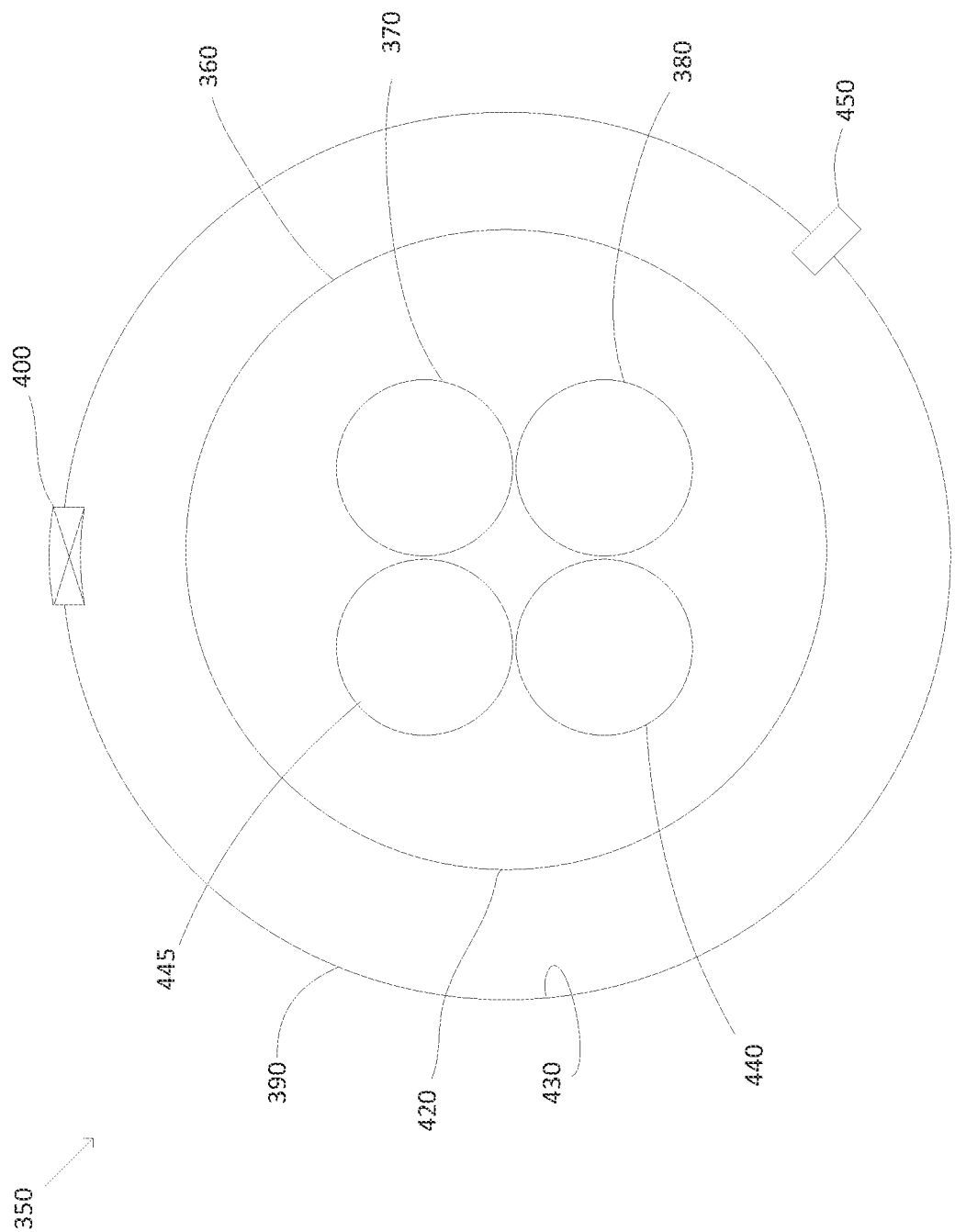

FIG. 3 schematically depicts a cross-sectional view of an umbilical assembly 350 according to an embodiment of the invention. The umbilical assembly 350 comprises an inner umbilical 360. The inner umbilical 360 comprises an optical fiber 370 for transmitting a laser beam. The inner umbilical 360 further comprises an electrically conductive cable 380. The umbilical assembly 350 further comprises an outer conduit 390 for transmitting a fluid, e.g. the suppression fluid or the extraction fluid. The outer conduit 380 is configured to receive the inner umbilical 360. An internal volume of the outer conduit 390 is large enough to accommodate the marking head of the laser marking system shown in FIG. 1 and FIG. 2.

The outer conduit 390 is reversibly connectable to the marking head 120 of the laser marking system 100 of FIG. 1. The outer conduit 390 is reversibly connectable to the housing 130 of the laser marking system 100 of FIG. 1. The inner umbilical 360 is reversibly connectable to the marking head 120 of the laser marking system 100 of FIG. 1. The inner umbilical 360 is reversibly connectable to the housing 130 of the laser marking system 100 of FIG. 1. The umbilical assembly 350 is reversibly sealable to the marking head 120 and the housing 130 of the laser marking system 100 of FIG. 1 so as to prevent ingress of fluid or debris.

The outer conduit 390 is reversibly removable from the inner umbilical 360. For example, the outer conduit 390 may be separable. That is, the outer conduit 390 may be split or otherwise parted along its circumference to allow access to the inner umbilical 360. In the example of FIG. 3, the outer umbilical 390 comprises a zip 400 that may be used to separate the outer umbilical 390.

Referring again to FIG. 1, the umbilical assembly 350 further comprises a scrubber 410 configured to clean the inner umbilical 360. That is, the outer conduit 390 may be separated, thereby allowing access to the inner umbilical 360 and the scrubber 410. The scrubber 410 may, for example comprise a sponge-like material.

Referring again to FIG. 3, an outer surface 420 of the inner umbilical 360 and an inner surface 430 of the outer conduit 390 may comprise a chemically resistant material and/or a heat resistant material and/or a material that is impervious to water and/or a hygienic material. The outer surface 420 of the inner umbilical 360 and/or an inner surface 430 of the outer conduit 390 may be smooth.

The electrically conductive cable 380 may be configured to transmit a control signal, e.g. from the controller 270 (shown in FIG. 1) to the electromagnetic radiation steering mechanism 310 (shown in FIG. 2). The electrically conductive cable 380 may be configured to transmit a sensor signal, e.g. from the sensor 180 (shown in FIG. 2) to a user interface of the laser marking system 100 (shown in FIG. 1). The electrically conductive cable 380 may be configured to transmit power, e.g. from the power source 260 (shown in FIG. 1) to the variable optical path length assembly 320 (shown in FIG. 2).

The inner umbilical 360 may further comprise ducting 440, 445 for transmitting a fluid, such as the suppression fluid 330 or the extraction fluid 160 (shown in FIG. 2). The ducting 440, 445 may be configured to transmit the suppression fluid 330 to the radiation shield 170 (shown in FIG. 2). The ducting 440, 445 may be configured to transmit extraction fluid 160 from the radiation shield 170 and direct the extraction fluid 160 to the extraction device 140 (shown in FIG. 1). The umbilical assembly 350 may further comprise a port 450 for connecting the umbilical assembly 350 to an exhaust system (not shown).

The laser marking process may include providing radiation to the umbilical assembly 350 by coupling a radiation source such as, for example, a $CO_2$ laser or a diode laser to the umbilical assembly 350. The radiation source 110 may, alternatively be located within the marking head 120. The umbilical assembly 350 may be connected to the marking head 120. An optical fibre of the umbilical assembly 350 may direct the radiation to a collimator of the marking head 120. The collimator may condition the radiation in a desired manner before directing the radiation to other components of the marking head such as the variable optical path length assembly 320 (which may alter a focal plane of the laser marking system in a desired manner) and/or the electromagnetic radiation steering mechanism 310 (which may steer the radiation exiting the marking head in a desired manner).

The variable optical path length assembly 320 and/or the electromagnetic radiation steering mechanism 310 provide compact ways of controlling the radiation exiting the marking head 120, thereby enabling a small, lightweight marking head 120 to be used instead of bulky and heavy known marking heads.

The radiation may exit the marking head 120 and be incident upon a product 200. The radiation may mark, etch or otherwise interact with a desired portion of a surface of the product 200 in order to change an appearance of the product 200. An interaction of the radiation with the product 200 may result in the production of matter e.g. gaseous matter such a fumes and/or solid matter such as particulate debris. The extraction device 140 may generate a flow of extraction fluid 160 which may be sucked from the integrated extraction inlet 190 of the radiation shield 170 of the marking head 120 towards the housing 1330 holding the extraction device 140 via the ducting 440 of the umbilical assembly 350. This advantageously provides an integrated solution to the problem of the generation of matter during laser marking that avoids the need for bulky separate fume extractors.

The umbilical assembly 320 further advantageously transmits control signals, power, sensor signals, etc. between components of the housing 130 (e.g. the laser source 110 and/or the controller 270) and the marking head 120 whilst being flexible enough to easily reposition the marking head 120 with respect to a production line. The separable outer conduit 390 of the umbilical assembly 350 allows easy access to the inner umbilical 360 and/or replacement of the outer conduit 390 without having to disconnect the umbilical assembly 350 from the housing 130 or the marking head 120. The scrubber 410 advantageously provides an easy way of removing dirt (e.g. the matter extracted from the product 200 by the extraction fluid) that has accumulated on an outer surface 420 of the inner umbilical 360 without having to come into direct contact with the potentially hazardous material on the inner umbilical 360.

Stray radiation (e.g. radiation scattering from the product 200 and/or refracting through matter between the product 200 and the radiation shield 170) may be captured, absorbed and/or otherwise re-directed by the radiation shield 170 so as to protect a user of the laser marking device from the stray radiation. The flange 230, the flexible member 240 and/or the sensor 180 may provide further protection to a user of the laser marking system from stray radiation. This advantageously provides an integrated solution to the problem of providing adequate radiation protection and meeting radiation safety requirements whilst avoiding the need for a large, expensive, customised radiation shielding unit to envelope a part of a production line that the laser marking system is installed on.

The laser marking system described and depicted herein advantageously overcomes problems associated with known laser marking systems discussed above, offering a fully integrated, "plug-and-play" solution for owners of a production line.

Having thus described several aspects of at least one implementation, it is to be appreciated various alterations, modifications, and improvements will readily occur to those skilled in the art. Such alterations, modifications, and improvements are intended to be part of this disclosure, and are intended to be within the spirit and scope of the disclosure. The acts of methods disclosed herein may be performed in alternate orders than illustrated, and one or more acts may be omitted, substituted, or added. One or more features of any one example disclosed herein may be combined with or substituted for one or more features of any other example disclosed. Accordingly, the foregoing description and drawings are by way of example only.

The phraseology and terminology used herein is for the purpose of description and should not be regarded as limiting. As used herein, the term "plurality" refers to two or more items or components. As used herein, dimensions which are described as being "substantially similar" should be considered to be within about 25% of one another. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The electromagnetic radiation steering mechanism may include various types of optical components, such as refractive, reflective, magnetic, electromagnetic, electrostatic, and/or other types of optical components, or any combination thereof, for directing, shaping, and/or controlling electromagnetic radiation.

Although specific reference may be made in this text to the use of an electromagnetic radiation steering mechanism in the marking of products, it should be understood that the electromagnetic radiation steering mechanism described herein may have other applications. Possible other applications include laser systems for engraving products, optical scanners, radiation detection systems, medical devices, etc.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

The invention claimed is:

1. A laser marking system for marking a product comprising:
   a laser source for providing a laser beam;
   a marking head for projecting the laser beam on to the product;
   a housing comprising:
      an extraction device configured to generate a flow of extraction fluid for extracting matter generated by an interaction between the laser beam and the product; and,
      a controller for controlling the laser source and the marking head;
   wherein the laser marking system further comprises an umbilical assembly connecting the housing to the marking head,
   wherein the marking head comprises a radiation shield for protecting a user of the laser marking system from stray radiation,
   wherein the marking head is configured to be arranged such that there is a gap between a portion of the radiation shield and the product, and
   wherein the radiation shield comprises a sensor configured to detect escaping radiation emanating from the gap between the portion of the radiation shield and the product.

2. The laser marking system of claim 1, wherein the housing comprises the laser source.

3. The laser marking system of claim 1, wherein the marking head comprises the laser source.

4. The laser marking system of claim 1, wherein the radiation shield comprises an integrated extraction inlet that is fluidly coupled to the extraction device.

5. The laser marking system of claim 4, wherein the integrated extraction inlet is configurable to be located substantially adjacent to the product.

6. The laser marking system of claim 1, wherein the radiation shield comprises a conduit configured to provide a flow of suppression fluid to reduce an amount of debris that is incident upon an optical element of the marking head.

7. The laser marking system of claim 1, wherein the radiation shield comprises a flange for providing further protection to a user of the laser marking system from stray radiation.

8. The laser marking system of claim 1, wherein the radiation shield comprises a flexible member arranged to reduce a gap between the radiation shield and the product for providing further protection to a user of the laser marking system from stray radiation.

9. The laser marking system of claim 1, wherein the extraction device is configured to provide cooling to the laser source.

10. The laser marking system of claim 1, wherein the marking head comprises an electromagnetic radiation steering mechanism configured to steer electromagnetic radiation to address a specific location within a two-dimensional field of view.

11. The laser marking system of claim 10, wherein the marking head comprises a cooling system for providing cooling to a component of the marking head.

12. The laser marking system of claim 11, wherein the radiation shield comprises a conduit configured to provide a flow of suppression fluid to reduce an amount of debris that is incident upon an optical element of the marking head,
   and wherein the cooling system is configured to use the suppression fluid of the radiation shield to cool the component of the marking head.

13. The laser marking system of claim 1, wherein the umbilical assembly comprises an electrically conductive cable and ducting for transmitting a fluid.

14. The laser marking system of claim 13, wherein the electrically conductive cable is configured to transmit a control signal.

15. The laser marking system of claim 13, wherein the electrically conductive cable is configured to transmit a sensor signal.

16. The laser marking system of claim 13, wherein the electrically conductive cable is configured to transmit power.

17. The laser marking system of claim 13, wherein the radiation shield comprises a conduit configured to provide a flow of suppression fluid to reduce an amount of debris that is incident upon an optical element of the marking head,
   and wherein the ducting is configured to transmit the suppression fluid to the radiation shield.

18. The laser marking system of claim 13, wherein the ducting is configured to transmit the extraction fluid from the radiation shield.

19. The laser marking system of claim 1, wherein the product is one of a plurality of products that pass the marking head on a production line and the marking head is a component of the production line and imprints information on products transported on the production line.

20. An umbilical assembly for a laser marking system comprising:

an inner umbilical comprising:
an optical fibre for transmitting a laser beam, and,
an electrically conductive cable;
the umbilical assembly further comprising an outer conduit for transmitting a fluid;
wherein the outer conduit is configured to receive the inner umbilical;
and wherein an internal volume of the outer conduit is large enough to accommodate a marking head of the laser marking system.

21. The umbilical assembly according to claim 20, wherein the outer conduit is reversibly connectable to the marking head of the laser marking system.

22. The laser marking system for marking a product comprising:
a laser source for providing the laser beam;
the marking head for projecting the laser beam on to the product;
a housing comprising an extraction device configured to generate a flow of extraction fluid for extracting matter generated by an interaction between the laser beam and the product, and a controller for controlling the laser source and the marking head; and
the umbilical assembly according to claim 20, the umbilical assembly being configured to connect the housing to the marking head.

* * * * *